United States Patent [19]
White

[11] Patent Number: 5,755,512
[45] Date of Patent: May 26, 1998

[54] TEMPERATURE SENSING METHODS AND APPARATUS

[75] Inventor: Julian Darryn White, Chepstow, England

[73] Assignee: Electrotech Limited, Bristol, United Kingdom

[21] Appl. No.: 637,599

[22] Filed: Apr. 25, 1996

[30] Foreign Application Priority Data

Apr. 26, 1995 [GB] United Kingdom ............ 9508427

[51] Int. Cl.$^6$ ............................................ G01K 11/00
[52] U.S. Cl. .................... 374/161; 374/130; 356/301
[58] Field of Search ................... 374/120, 121, 374/127, 130, 131, 161; 356/43, 44, 301; 364/557; 250/340

[56] References Cited

U.S. PATENT DOCUMENTS

| | | | |
|---|---|---|---|
| 4,081,215 | 3/1978 | Penney et al. | |
| 4,729,668 | 3/1988 | Angel et al. | 374/131 |
| 4,767,219 | 8/1988 | Bibby | 374/131 |
| 5,028,146 | 7/1991 | Wada | 374/130 |
| 5,054,935 | 10/1991 | Tanabe et al. | 374/131 |
| 5,194,913 | 3/1993 | Myrick et al. | |
| 5,217,306 | 6/1993 | Wada | 374/131 |
| 5,235,399 | 8/1993 | Usui et al. | 374/130 |
| 5,388,909 | 2/1995 | Johnson et al. | 374/161 |
| 5,449,233 | 9/1995 | Sai et al. | 374/161 |

FOREIGN PATENT DOCUMENTS

| | | |
|---|---|---|
| 07318426 | 12/1995 | Japan. |
| WO 94/25861 | 11/1994 | WIPO. |

*Primary Examiner*—G. Bradley Bennett
*Attorney, Agent, or Firm*—Jones & Volentine, L.L.P.

[57] ABSTRACT

This invention relates to apparatus for sensing, remotely, the temperature of a semi-conductor wafer and includes means for shining a single frequency light 11 onto the surface 12 of a semi-conductor wafer 13 so that some of that light is scattered. The scattered light is focused by a lens 15 and the single frequency is filtered out of the scattered light by notch filter 17. The filtered beam is split by beam splitter 18 and the resultant two beams are filtered so that they respectively pass only the Stokes and anti-Stokes frequencies respectively. The intensities of these respective light beams are then measured and from these the temperature of the semi-conductor wafer is calculated.

24 Claims, 7 Drawing Sheets

TEMPERATURE SENSING METHODS AND APPARATUS

This invention relates to methods and apparatus for sensing temperature and in particular, but not exclusively, to sensing the temperature of workpieces such as semiconductor wafers including silicon wafers.

When undergoing processing, the temperature of a semiconductor wafer can be crucial in determining the rate of physical and chemical processes occurring on its surface. These processes finally determine the electrical properties of the finished micro-circuits thus created. Unfortunately, measuring the temperature of a semi-conductor wafer in situ during processing is extremely difficult.

Various proposals have been made. Thus in Applied Physics Letters, 60, page 524–6, a method is described which measures changes in the reflective properties of silicon with temperature. However the method is dependent on the properties of a particular silicon wafer, for example its surface finishing and doping density, and accordingly it is not really acceptable for use in a production operation.

An alternative approach, using an infra-red laser interferometer, is described in Applied Physics Letters, 63, 1396–8. This detects the expansion of the silicon wafer during heating, but for a high level of accuracy you have to know the initial temperature and thickness of the wafer and so once again it is not conducive to production techniques. Further the method produces no signal, when a steady state is reached. Various parties have attempted to use pyrometry. This technique is dependent on the intensity of radiation given off at a particular wavelength, which is strongly dependent on the emissivity of the wafer, which is a characteristic which can undergo large changes. Pre-calibration is therefore extremely difficult. Further emissivity is dependent on the surface finish of the wafer and thus may vary from wafer to wafer in the same batch. An example of such an arrangement is described in Applied Physics Letters, 55, page 2138.

The present invention consists in apparatus for sensing remotely the temperature of a workpiece as hereinafter defined comprising, a light source for generating a single frequency light beam directable at a surface of the workpiece such that the light can interact with the lattice of the workpiece material, optical means for forming a beam from light scattered from the illuminated surface, first filter means for filtering out the single frequency from the emitted beam, beam splitter means for splitting the scattered beam either before or after the single frequency is filtered into two separate beams, a first optical path for one of the separate beams comprising second filter means for passing only the Stokes frequency related to the single frequency and a detector for detecting the intensity of the Stokes frequency light, a second optical path for the other of the separate beams comprising third filter means for passing only the anti-Stokes frequency related to the single frequency and a detector for detecting the intensity of the anti-Stokes frequency light and means for calculating the temperature of the semi-conductor workpiece from the detected intensities at the Stokes and anti-Stokes frequencies.

It will be appreciated that the apparatus can detect the temperature of any workpiece which produces clearly defined Raman-Stokes and anti-Stokes signals by single or multi-phonon scattering and, for the purposes of this specification, the term workpiece means any workpieces which satisfy that criterion. Currently, it is believed that they include workpieces made from a multitude of crystalline, semi-crystalline, amorphous and glass-like materials. The apparatus is for example suitable for measuring the temperature of silicon bodies such as semi-conductor wafers.

References to "a single frequency" in this specification are intended to cover signals which are substantially at the single frequency. It is recognised that almost every laser source produced radiation at other frequencies, but in these cases, this radiation will be at a very low level. If it is not, then the output of the light source may be filtered to improve the "cleanness" of the signal. References to filtering cover any mechanisms or procedure for removing or passing, as appropriate, the desired frequency.

The light beam may be provided at an angle to the plane in which the workpiece surface will lie and in this case the optical means may include a collection lens for focusing emitted light and the half angle $\phi$ subtended by the lens is preferably less than $\theta$, the angle of incidence of the light beam to the normal of the plane.

An optical fiber path may be provided for at least part of the path of the light beam and/or the emitted beam.

In a separate approach the optical means may include a collection lens for focusing the scattered light and the incident light beam may be directed through the collection lens, in an opposite sense, to be focused on the plane in which the workpiece surface is intended to lie. In this case the incident light beam may be supplied at an angle to the axis of the collection lens and the apparatus may further comprise a mirror for reflecting the incident light beam through the lens towards the plane. The mirror may be constituted by the first filter means, when that filter works on a reflection basis.

The calculating means may calculate the temperature in accordance with the following formula:

$$T = \frac{\hbar \Delta \omega}{K} \left[ 4\ln\left(\frac{\omega_A}{\omega_S}\right) - \ln\left(\frac{I_A}{I_S}\right) \right]^{-1}$$

where

T is the temperature of the workpiece
ℏ is Plank's constant
K is Boltzmann's constant
$\Delta\omega$ is the phonon frequency
$I_A$ is the intensity of light at the anti-Stokes frequency
$I_s$ is the intensity of light at the Stokes frequency.

From another aspect the invention consists in a method of sensing, remotely, the temperature of a workpiece as hereinbefore defined comprising the steps of illuminating a surface of a workpiece with light of a single frequency such that the light can interact with the lattice of the workpiece material, forming a beam of light scattered from the illuminated surface, filtering the single frequency from the scattered beam, detecting, respectively, the intensity of light at the Stokes and anti-Stokes frequencies associated with the single frequency and calculating the temperature of the wafer from the detected intensities.

In that case the filtered scattered beam may be split into two beams and the anti-Stokes intensity is detected from one, whilst the Stokes intensity is detected from the other.

The temperature may be calculated in accordance with the following formula:

$$T = \frac{\hbar \Delta \omega}{K} \left[ 4\ln\left(\frac{\omega_A}{\omega_S}\right) - \ln\left(\frac{I_A}{I_S}\right) \right]^{-1}$$

where

T is the temperature of the workpiece h is Plank's constant

K is Boltzmann's constant $\Delta\omega$ is the phonon frequency $I_A$ is the intensity of light at the anti-Stokes frequency $I_s$ is the intensity of light at the Stokes frequency.

Although the invention has been defined above it is to be understood it includes any inventive combination of the features set out above or in the following description.

The invention may be performed in various ways and specific embodiments will now be described, by way of example, with reference to the accompanying drawings in which.

Raman scattering occurs when light interacts with a crystal lattice. The crystal lattice is always vibrating, and the vibrations are transmitted through the crystal in discrete packets, called phonons. When light is shone onto a crystal, a small proportion of it interacts directly with the lattice, where to a good approximation, the light can create phonons, and so lose energy in the process. Alternatively, the light can absorb phonons which already exist in the lattice, and be increased in energy. Hence the scattered light from a crystal consists of the central frequency, and the up and down shifted bands. For silicon, if the light is generated by HeNe laser at 632.8 nm, the Stokes light (shifted down in energy) will appear at 663 nm in wavelength, and the anti-Stokes light (shifted up in energy) will appear at 603 nm. The relative amplitude of the two Raman scattering peaks depends on temperature via a simple relationship, thus enabling an absolute value for the temperature to be determined via a formula or a look up table. In order to establish the mathematical basis for the temperature calculation we need to define the following terms:

$\Omega_L = 2\pi f_L$ where $f_L$ is the frequency of the laser used to excite the crystal, $\Omega_s$ is the angular frequency of the light that is down shifted in frequency (STOKES SHIFTED), $\Omega_A$ is the angular frequency of the light that is up shifted in frequency (ANTI-STOKES SHIFTED), $|(\Omega_L - W_s)| = |(\Omega_A - \Omega_L)| = \Delta\Omega$, which is the energy of the lattice vibration quantum in the crystal (normally called a phonon).

$$\frac{I_s}{I_L}$$

is called the Raman efficiency (usually ~1%).

From quantum relations we derive the following relation:

$$\frac{I_A}{I_S} = \left(\frac{\omega_A}{\omega_S}\right)^4 \exp\left[\frac{-\hbar\Delta\omega}{KT}\right]$$

where h is Planks constant=$1.054 \times 10^{-34}$ and K is Boltzmann's constant $1.381 \times 10^{-23}$ joule/k and T is the temperature of the crystal in Kelvin and $\Delta\Omega$ is the phonon frequency.

Thus the temperature can be derived from the equation above as follows:

$$\ln\left(\frac{I_A}{I_S}\right) = 4\ln\left(\frac{\omega_A}{\omega_S}\right) - \frac{\hbar\Delta\omega}{KT}$$

Rearranging gives:

$$\frac{\hbar\Delta\omega}{KT} = 4\ln\left(\frac{\omega_A}{\omega_S}\right) - \ln\left(\frac{I_A}{I_S}\right)$$

and hence $$T = \frac{\hbar\Delta\omega}{K}\left[4\ln\left(\frac{\omega_A}{\omega_S}\right) - \ln\left(\frac{I_A}{I_S}\right)\right]^{-1}$$

Thus, the temperature can be found from the relative intensity of the Stokes and the anti-Stokes scattering intensities, assuming that $\Omega_A$, and $\Omega_S$ are constant.

Figure 2:
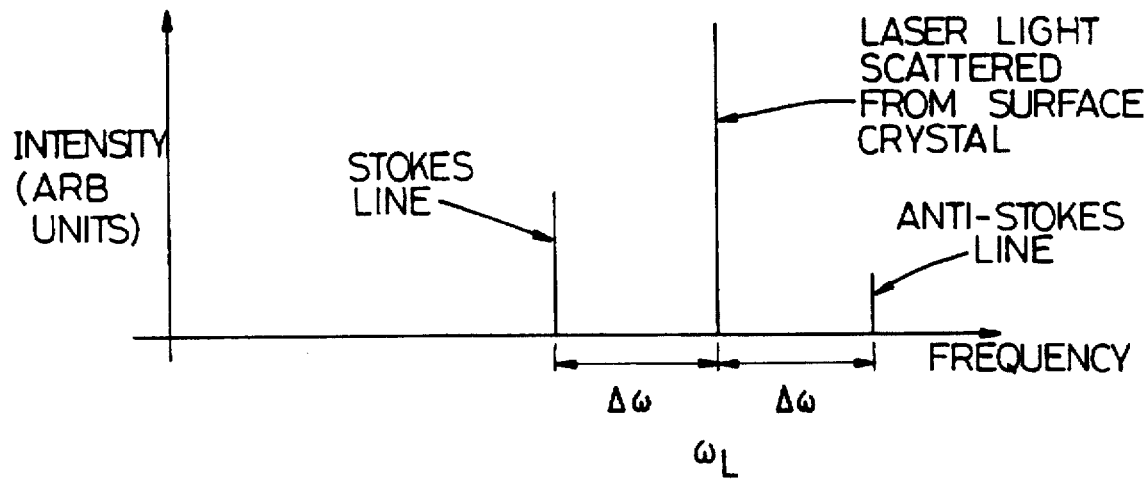
FIG. 2 is a diagrammatic spectrum of the emitted, or scattered, light.

The typical spectrum of the scattered light, is illustrated in FIG. 2.

Figure 1:
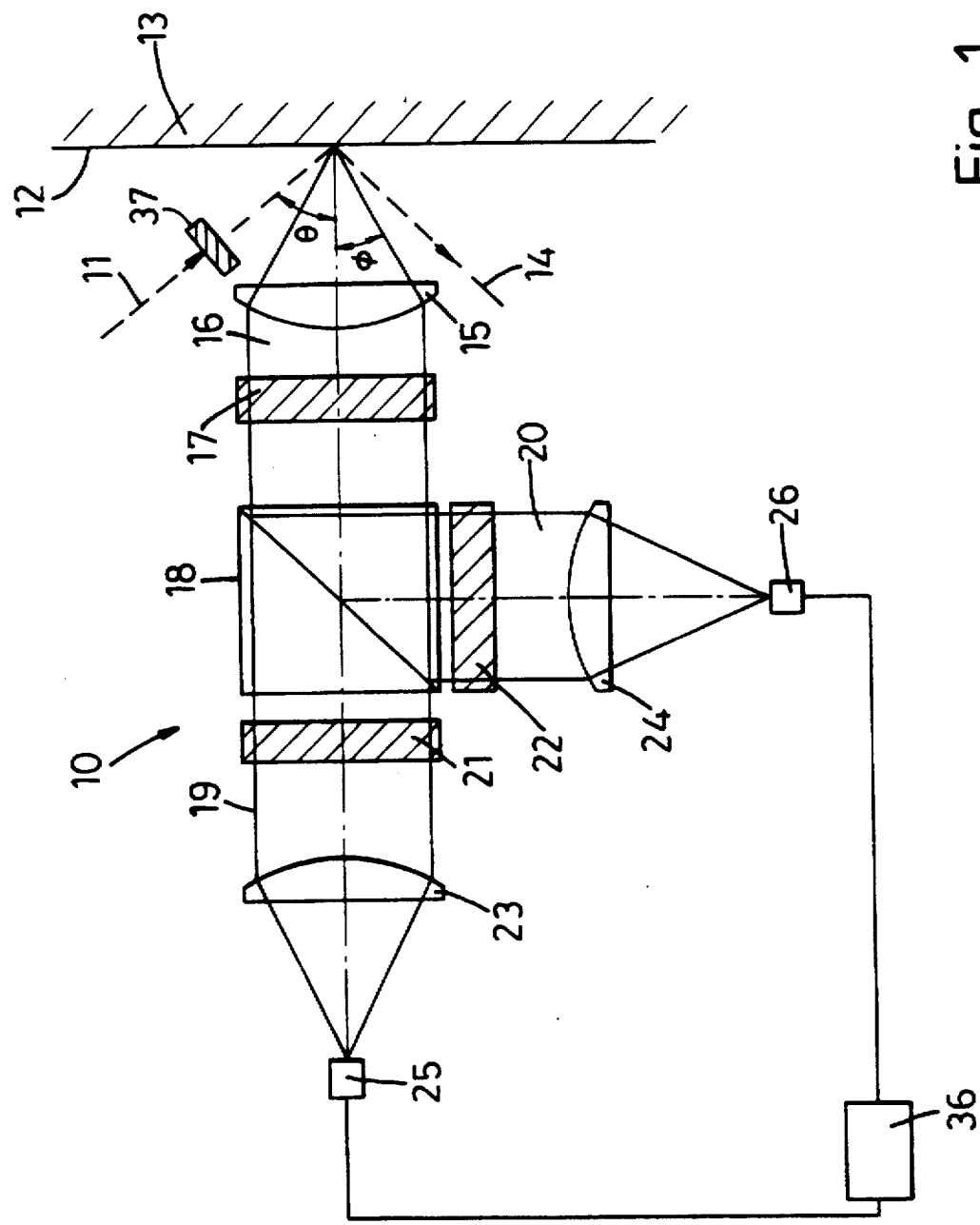
FIG. 1 is a schematic view of a temperature measuring apparatus.

FIG. 1 illustrates an apparatus, generally indicated at 10, which utilizes the relationship between temperature and the Stokes and anti-Stokes intensities.

Figure 3:
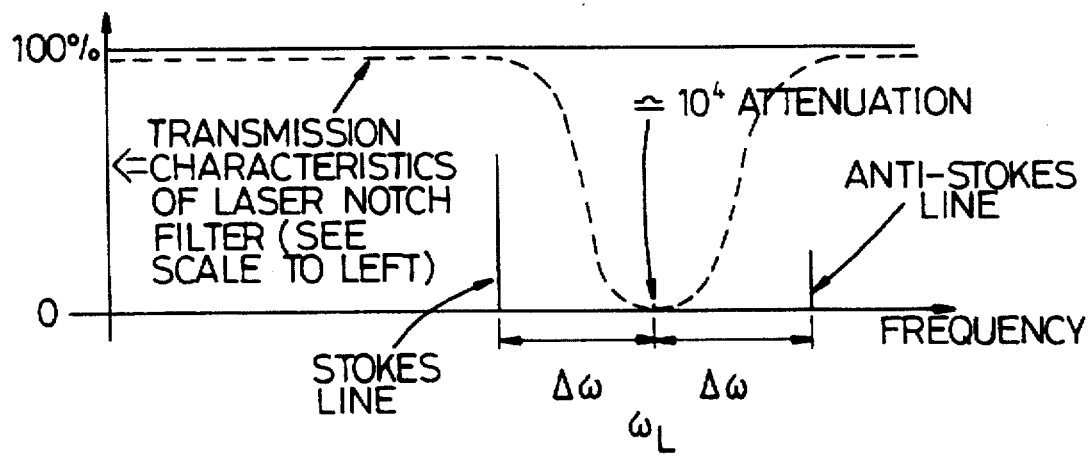
FIG. 3 is the corresponding spectrum after the light has passed through a first filter.
Figure 4:
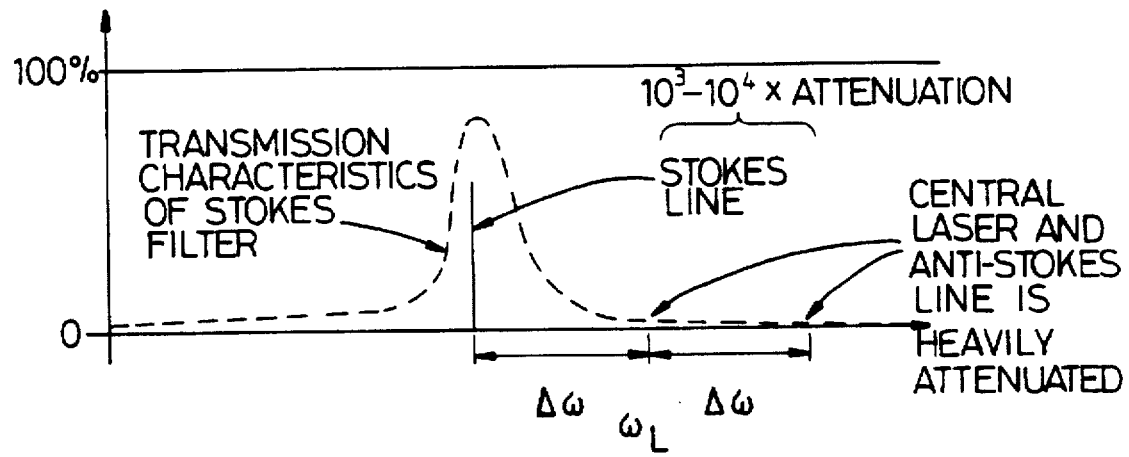
FIG. 4 is the spectrum received by the Stokes detector of the apparatus of FIG. 1.
Figure 5:
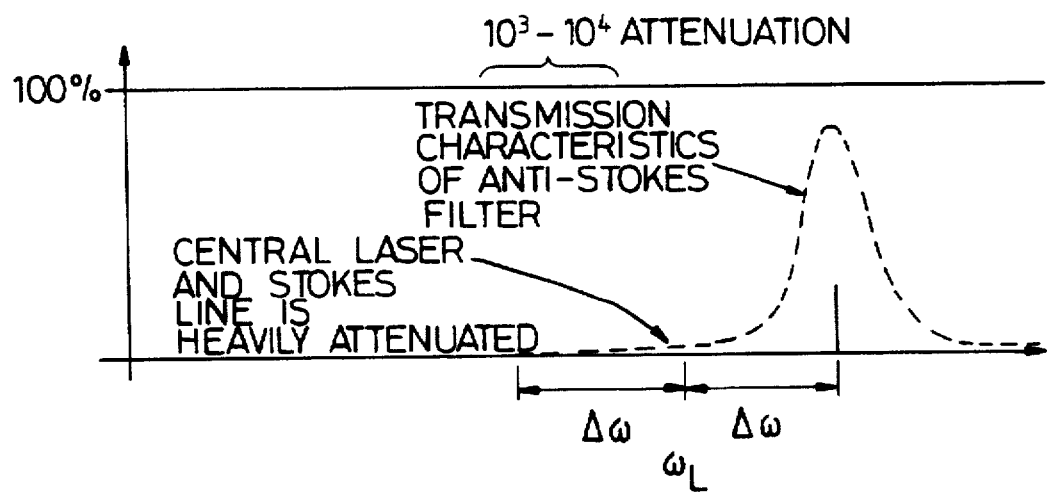
FIG. 5 is the spectrum received by the Anti-Stokes detector of the apparatus of FIG. 1.

A beam of single frequency light 11 is shone, at an angle, onto a surface 12 of a silicon wafer 13. Some of the light beam 10 is reflected at 14, but some interacts with the crystal lattice of the silicon and is scattered. This scattered light is focused into a parallel beam by a collection lens 15. Preferably the half angle $\phi$ of the collection lens is less than $\theta$, which is the angle of the incident beam 11 to the normal of the wafer surface. This arrangement reduces the amount of light, at the laser frequency, which is simply reflected off the surface 12 in the direction of the lens 15. The parallel beam of scattered light 16 is then passed through a notch filter 17, which is designed to remove light at the incident beam or laser frequency. Preferably this filter 17 is one which is arranged to reflect light at that frequency. After the filter 17 the resultant spectrum of the beam 16 is shown in FIG. 3. The beam then passes to a beam splitter 18 which divides the beam 16 into two subsidiary beams 19, 20. The first beam 19 then passes through a filter 21 designed to pass light only at the anti-Stokes frequency, whilst the second beam 20 passed through a filter 22 which passes light at the Stokes frequency. Each of these beams is then focused by a respective lens 23, 24 onto a respective light detector 25, 26 which provide outputs representing the intensities of the respective frequencies. The spectra of the beams 19, 20 after filtering are shown in FIGS. 5 and 4 respectively.

The measured intensities are then passed to a computer 36 which calculates the temperature in accordance with the formula set out above.

The incident light beam 11 is preferably provided by a laser which has a narrow band and a guaranteed turn-on frequency. The most obvious choices in this respect are either an HeNe gas laser, a distributed Bragg reflector diode laser or an externally stabilised laser diode. The light detectors 25, 26 which may have their operating temperature stabilized by some external means, can conveniently be solid state detectors, but other known arrangements such as photo-multipliers may equally be used. The beam splitter 18 in FIG. 5 is shown in FIG. 1 as providing an even split, but where the anti-Stokes intensity is expected to be extremely small, a greater percentage of the beam 16 may be directed through that path, in which case the computer can make the necessary adjustment. In order to increase the signal to noise ratio, the incoming beam can be modulated using shutter 37. This would then enable frequency sensitive/phase locked detection techniques to be used. The use of such a detection scheme would be particularly valuable for detecting the weaker anti-Stokes signal at low temperatures.

Figure 6:
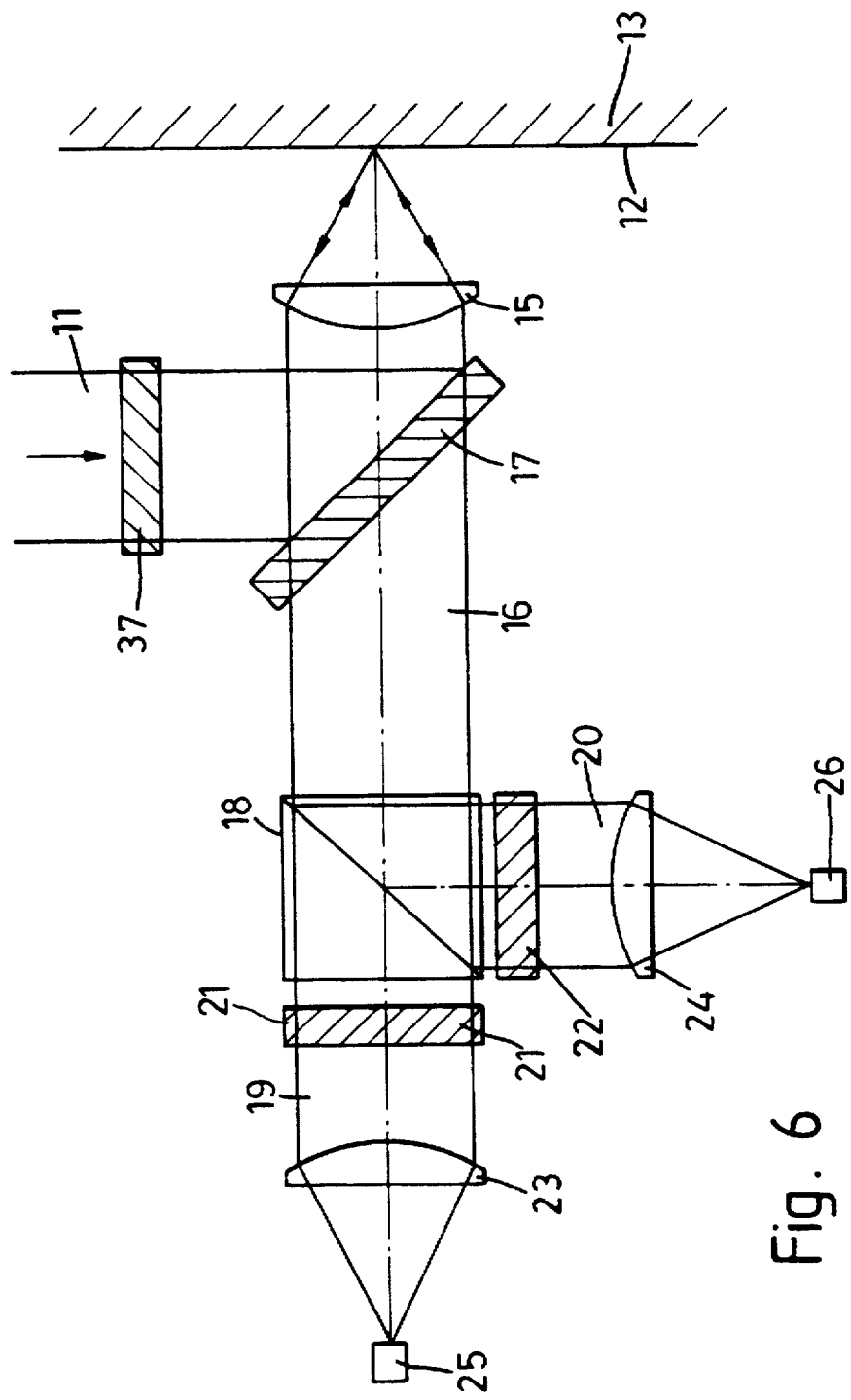
FIG. 6 is a diagrammatic view of a second embodiment of the apparatus of FIG. 1 incorporating optical fibre paths.
Figure 8A:
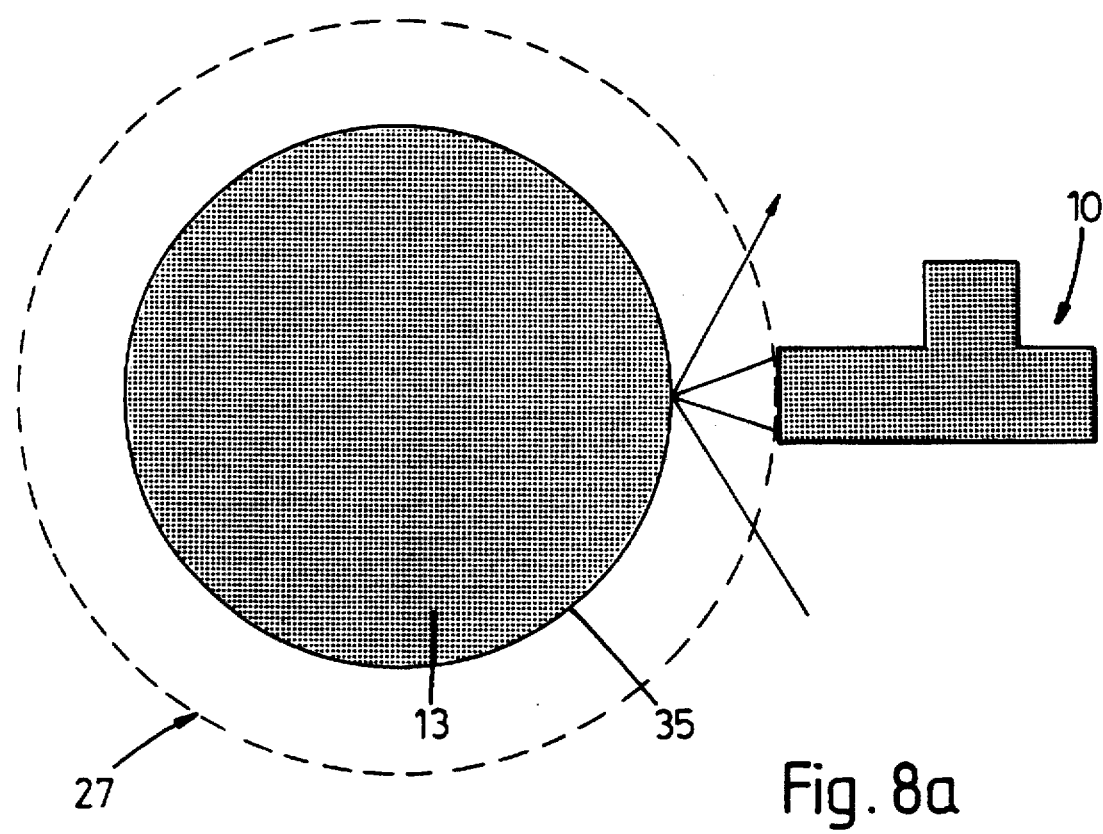
FIGS. 8a and 8b are schematic representations of the apparatus in situ in a processing machine.
Figure 8B:
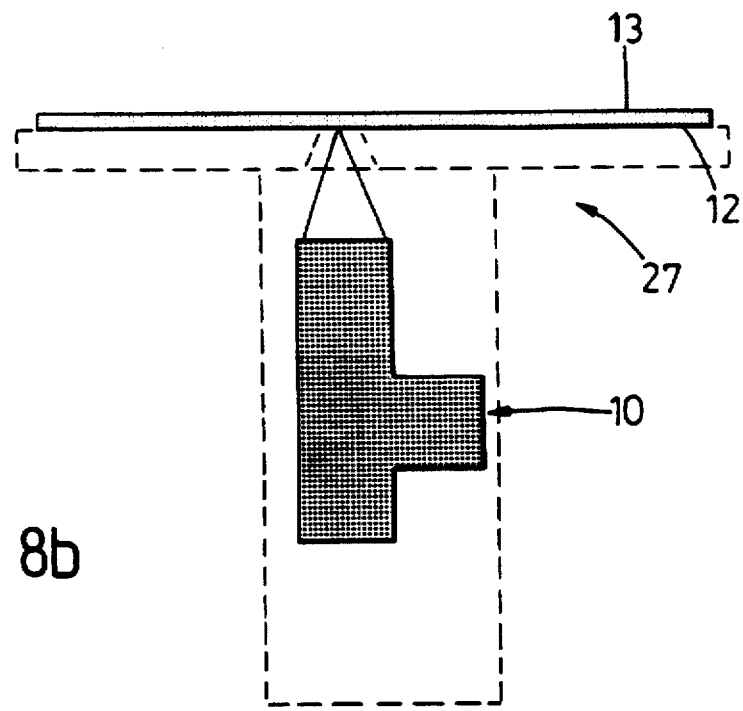
Figure 9:
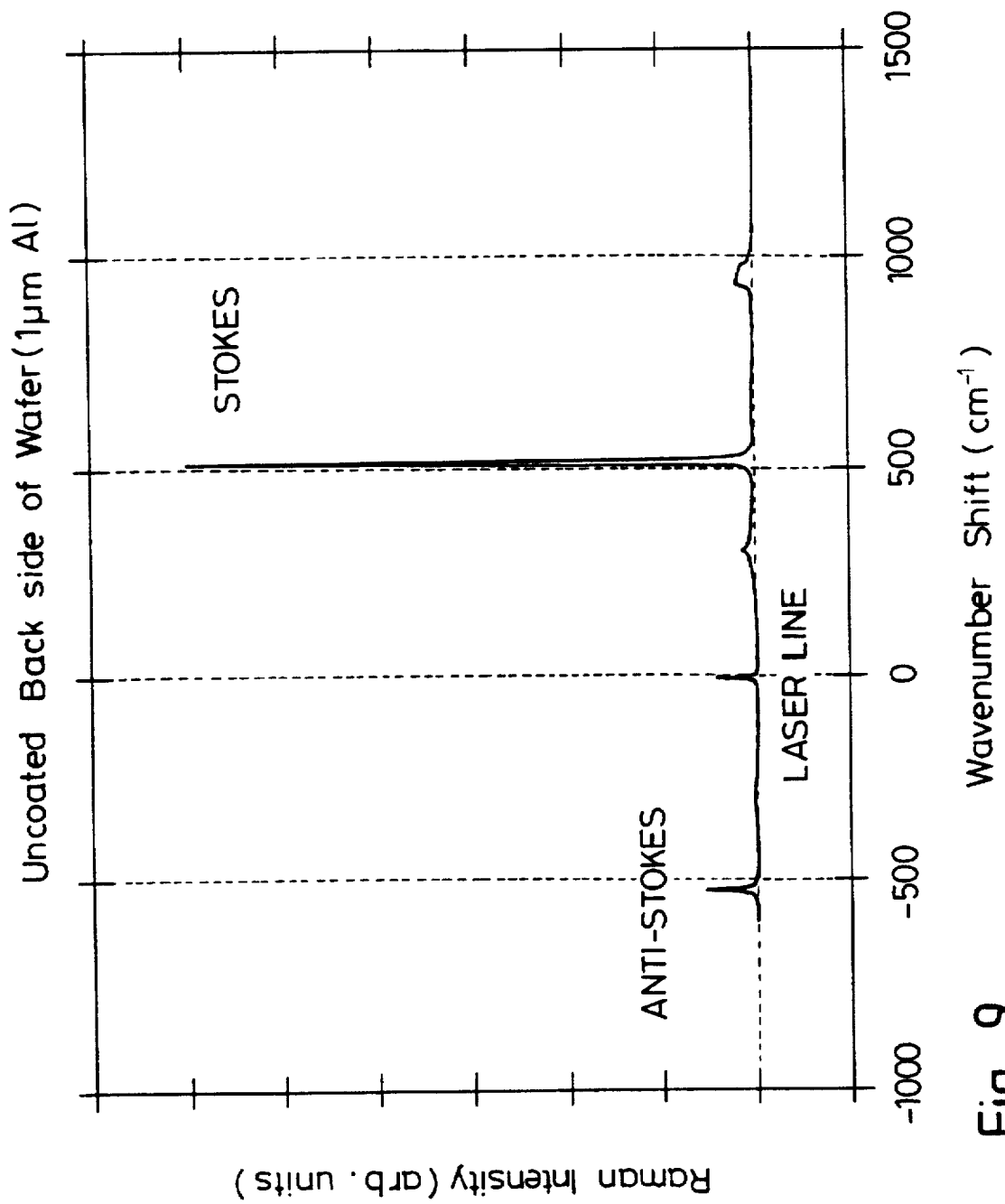
FIG. 9 is an actual spectrum of a filtered emitted signal.

FIG. 6 shows an alternative arrangement to FIG. 1 in which the incident beam 11 is in the form of an expanded laser beam which is directed at right-angles to the normal to the surface 12 so that the light can be reflected through the collection lens 15 and focused on the surface 12. Particularly conveniently the filter 17 can be used for this purpose as it is designed to be reflective at that frequency. By setting that filter at the appropriate angle for the incoming beam and reoptimizing the filter for use as a filter at that angle, various physical arrangements can be taken into account. The advantage of this construction is that light can be sent directly up the center of the processing apparatus 27 to the back of the wafer 13 for example as is illustrated in FIG. 8b.

Figure 7:
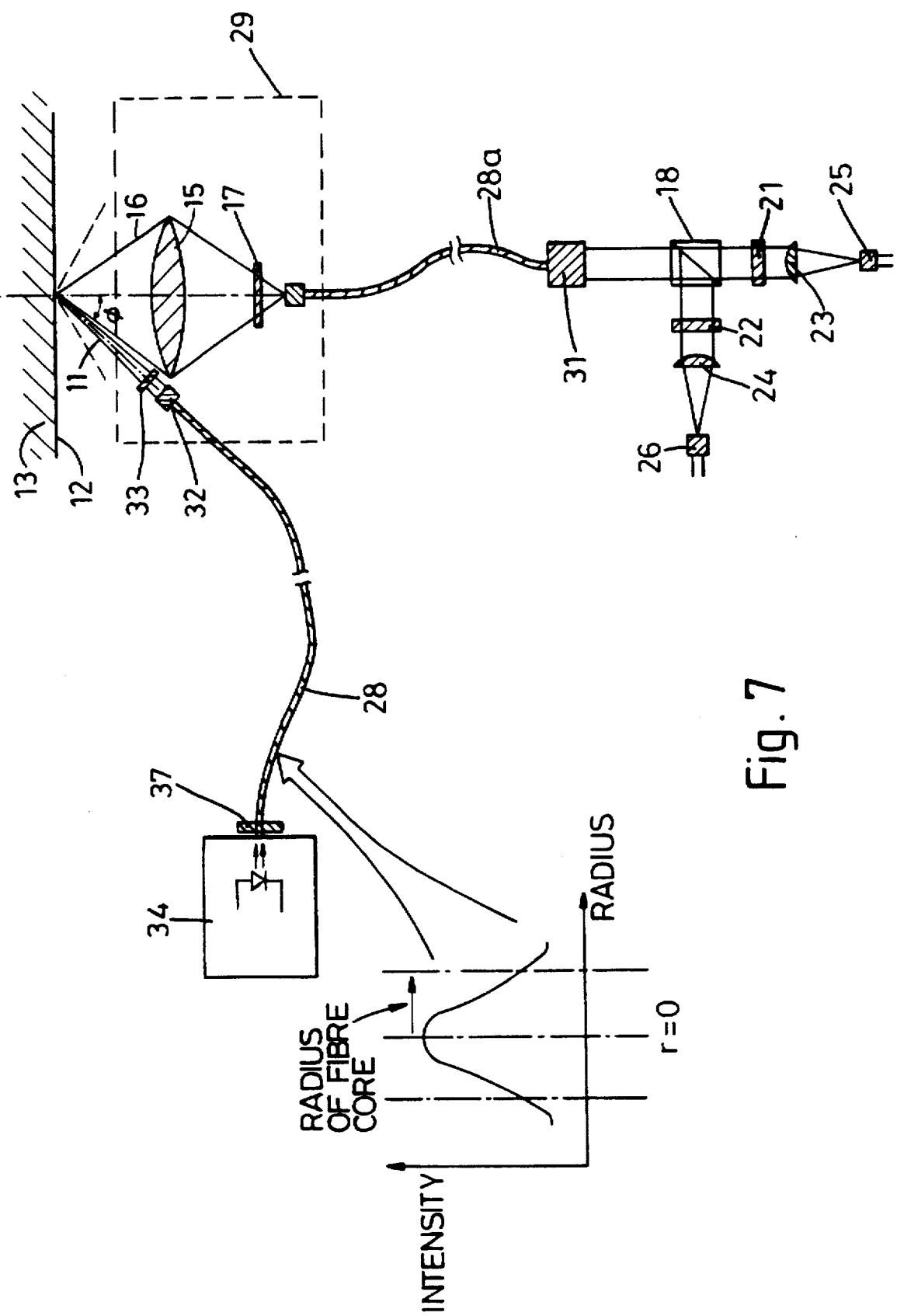
FIG. 7 is an alternative embodiment of the apparatus of FIG. 1.

A further alternative approach is illustrated in FIG. 7. In this arrangement both the incident beam 11 and the scattered light 16 are passed through optical fibers 28, 28a for a part of their path. The first fiber 28 is a single mode fiber. The second fibre 28a may be a fairly large φ fiber in order to ease the collection of light. This provides a significantly increased flexibility in the physical location of the various parts of the apparatus and only those parts in the dashed box 29 need be contained in the apparatus 27. In this arrangement the laser 34 is also illustrated. A beam expanding unit 31 is provided to expand the beam prior to it passing through the beam splitter and focusing optics 32 and a line pass filter 33 are provided for the incident beam. Returning to FIG. 8, FIG. 8a shows how the apparatus may be used on the side edge 35 of the wafer 13 whilst, as has been mentioned already, FIG. 8b illustrates how the apparatus may operate on the underside of the wafer.

From a temperature measuring point of view the undersurface measurement is to be preferred, because there is always clean exposed silicon at that location. However there are some practical problems in locating the apparatus within this configuration and so side-on measurements may be more suitable in some cases. Indeed the apparatus may be directed at any surface on the wafer 13 which is sufficiently exposed for the light beam 11 to interact with the lattice of the silicon. It has been determined that thin coatings of certain materials do not prevent such measurements, but it is most unlikely that the top surface 31 of the wafer 13 could be used throughout processing, unless some window was left or etched in the deposited material.

The signal-to-noise ratio of the measurement may be improved by using a polarised excitation beam and by placing a polarising element at the entrance to the optical assembly so that Raman scattered light is selectively passed to the assembly in preference to background radiation such an element is indicated at 38. In this arrangement any fiber optics used should be polarization preserving.

The equations and description above are based on the most intense scattering, i.e. first order scattering. Second order, and above scattering, can also be detected and processed in exactly the same manner and the use of these other orders is included within this specification and the invention.

The apparatus has been described in operation for measuring the temperature of a semi-conductor wafer, but as has already been mentioned it can be used with other workpieces in the defined class.

I claim:

1. Apparatus for sensing the temperature of a remotely positioned workpiece which is spaced from said apparatus comprising:

a light source for generating and directing a single frequency light beam onto a surface of the remotely positioned workpiece such that the light beam interacts with the atomic or molecular vibrations of a material of the workpiece;

optical means for forming a beam of light scattered from the surface;

first filter means for filtering out the single frequency from the scattered light beam;

beam splitter means for splitting the scattered beam, either before or after the single frequency is filtered by said first filter means, into two separate beams;

a first optical path for one of the two separate beams comprising second filter means for passing only the Stokes frequency light related to the single frequency and a detector for detecting the intensity of the Stokes frequency light;

a second optical path for the other of the two separate beams comprising third filter means for passing only the anti-stokes frequency light related to the single frequency and a detector for detecting the intensity of the anti-Stokes frequency light; and means for calculating the temperature of the workpiece from the detected intensities of the Stokes and anti-Stokes frequency lights.

2. Apparatus as claimed in claim 1 wherein said light source is for directing the light beam at an angle relative to the plane of the surface of the remotely positioned workpiece.

3. Apparatus as claimed in claim 2 wherein the optical means includes a collection lens for focusing the scattered light and the half angle φ subtended by the lens is less than θ, the angle of incidence of the light beam to the normal of the plane.

4. Apparatus as claimed in claim 1 wherein the light source is laser.

5. Apparatus as claimed in claim 4 further comprising a laser output filter for passing the single frequency.

6. Apparatus as claimed in claim 1 wherein an optical fiber path is provided for at least part of at least one of a path of the light beam and a path of the scattered beam.

7. Apparatus as claimed in claim 1 wherein the optical means includes a collection lens for focusing the scattered light and wherein the incident light beam is directed through the collection lens, in an opposite direction, to be focused on the surface of the remotely positioned workpiece.

8. Apparatus as claimed in claim 7 wherein the light beam is supplied at an angle to the axis of the collection lens and further comprising a mirror for reflecting the light beam through the lens.

9. Apparatus as claimed in claim 8 wherein the mirror is constituted by the first filter means.

10. Apparatus as claimed in claim 1 wherein the calculating means calculates the temperature in accordance with the following formula:

$$T = \frac{\hbar \Delta \omega}{K} \left[ 4\ln\left(\frac{\omega_A}{\omega_S}\right) - \ln\left(\frac{I_A}{I_S}\right) \right]^{-1}$$

where

T is the temperature of the workpiece

ℏ is Plank's constant

K is Boltzmann's constant

Δω is the phonon frequency $I_A$ is the intensity of light at the anti-Stokes frequency $I_s$ is the intensity of light at the Stokes frequency.

11. Apparatus as claimed in claim 1 wherein the single frequency light beam is polarized and further including a polarized element in the optical means for selectively passing scattered light of the appropriate polarization.

12. Apparatus as claimed in claim 1, wherein the workpiece is a remotely positioned semiconductor wafer.

13. Apparatus as claimed in claim 10, wherein the workpiece is a remotely positioned semiconductor wafer.

14. Apparatus as claimed in claim 1, wherein the workpiece is a remotely positioned body comprised of at least one of a crystalline material, a semi-crystalline material, an amorphous material and a glass material.

15. Apparatus as claimed in claim 10, wherein the workpiece is a remotely positioned body comprised of at least one of a crystalline material, a semi-crystalline material, an amorphous material and a glass material.

16. A method of remotely sensing the temperature of a workpiece comprising:

illuminating a surface of the workpiece with light of a single frequency such that the light interacts with the atomic or molecular vibrations of a material of the workpiece;

forming a beam of light scattered from the illuminated surface of the workpiece;

filtering the single frequency form the formed beam;

detecting, from the filtered beam, light intensities at the Stokes and anti-Stokes frequencies, respectively, associated with the single frequency, and calculating the temperature of the workpiece from the detected light intensities.

17. A method of claim 16 wherein the filtered emitted beam is split into two beams and the anti-Stokes intensity is detected from one and the Stokes intensity is detected from the other.

18. A method as claimed in claim 16 wherein the temperature is calculated in accordance with the following formula:

$$T = \frac{\hbar \Delta \omega}{K} \left[ 4\ln\left(\frac{\omega_A}{\omega_S}\right) - \ln\left(\frac{I_A}{I_S}\right) \right]^{-1}$$

where

T is the temperature of the workpiece

ℏ is Plank's constant

K is Boltzmann's constant

Δω is the phonon frequency $I_A$ is the intensity of light at the anti-Stokes frequency $I_s$ is the intensity of light at the Stokes frequency.

19. A method as claimed in claim 16, wherein the workpiece is a remotely positioned semiconductor wafer.

20. A method as claimed in claim 17, wherein the workpiece is a remotely positioned semiconductor wafer.

21. A method as claimed in claim 18, wherein the workpiece is a remotely positioned semiconductor wafer.

22. A method as claimed in claim 16, wherein the workpiece is a remotely positioned body comprised of at least one of a crystalline material, a semi-crystalline material, an amorphous material and a glass material.

23. A method as claimed in claim 17, wherein the workpiece is a remotely positioned body comprised of at least one of a crystalline material, a semi-crystalline material, an amorphous material and a glass material.

24. A method as claimed in claim 18, wherein the workpiece is a remotely positioned body comprised of at least one of a crystalline material, a semi-crystalline material, an amorphous material and a glass material.

* * * * *